Patented May 25, 1943

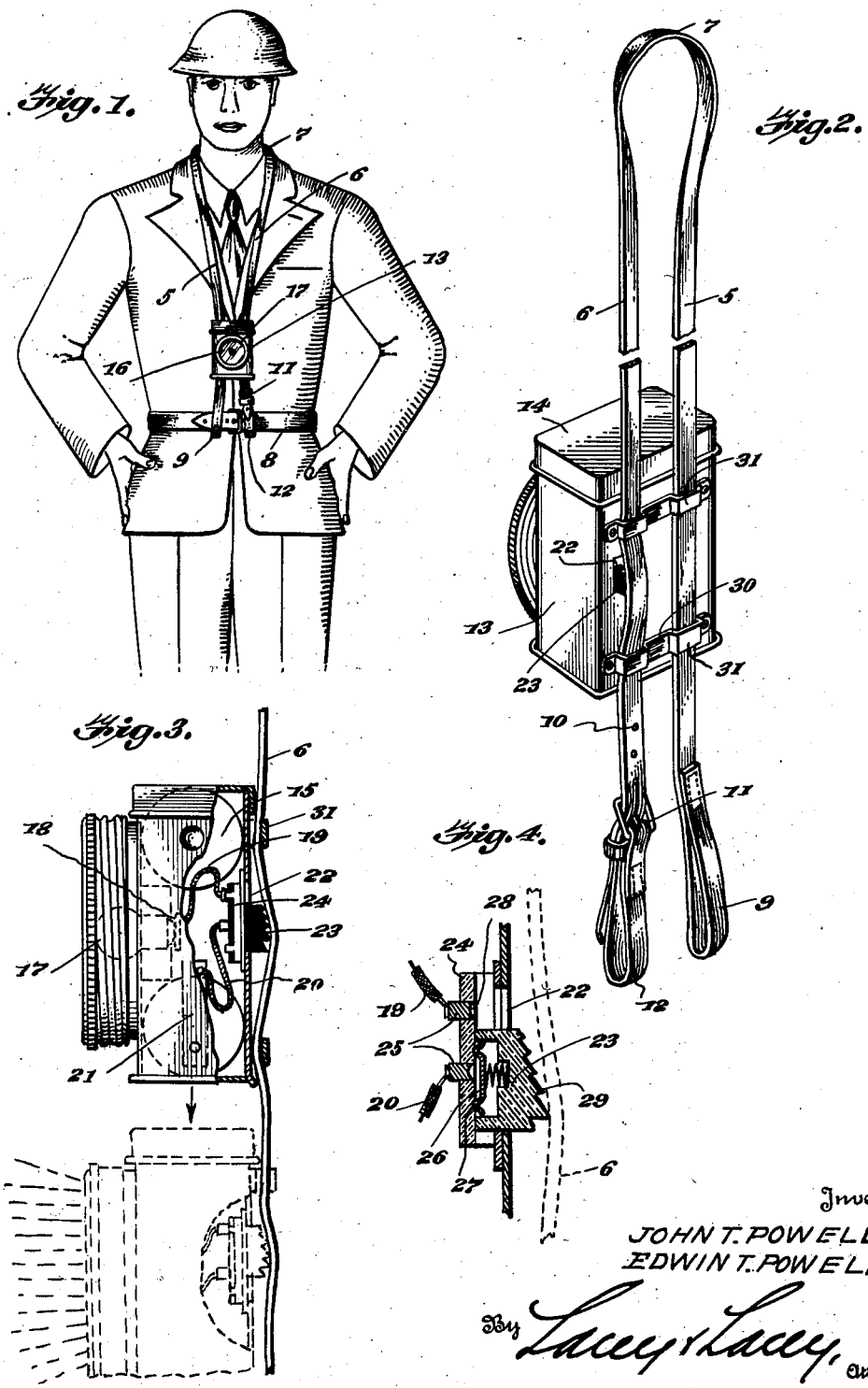

2,320,193

UNITED STATES PATENT OFFICE 2,320,193

COMBINED SAFETY LIGHT AND ILLUMINATING LAMP

John Thomas Powell and Edwin T. Powell, Washington, D. C.

Application January 13, 1942, Serial No. 426,622

6 Claims. (Cl. 240—59)

This invention relates to a combined safety light and illuminating lamp of that general class shown and described in United States Letters Patent, No. 1,825,088, issued to us on the 29th day of September, 1931, the present invention being an improvement thereon.

The object of the invention is generally to improve the construction of the device and to reduce the cost of manufacture by housing the lamp assembly, including the battery and its associated parts, within a box or container to permit said assembly to be moved as a unit to any selected position of vertical adjustment with respect to the suspension straps.

A further object of the invention is to provide the box or container with a light control switch normally disposed in front of one of the suspension straps and actuated by contact therewith to extinguish the light when the box is moved vertically in one direction and to turn on said light when the box is moved vertically in another direction.

A further object is to prevent tilting or canting of the lamp assembly box by providing the rear side thereof with upper and lower sets of guide loops for the reception of the suspension straps, one of the loops of each set serving to confine a portion of the adjacent suspension strap in position to frictionally engage and operate the light control switch.

Further objects and advantages will appear in the following description.

In the accompanying drawing:

Figure 1 is a perspective view of a combined safety light and illuminating lamp constructed in accordance with the present invention and showing it in position on the wearer.

Figure 2 is a perspective view of the device detached.

Figure 3 is an enlarged side elevation, partly in section, of the lamp assembly box, showing in full lines, the box adjusted vertically to cut off the light, and in dotted lines, the downward movement of the box to illuminate the light.

Figure 4 is an enlarged vertical sectional view of the sliding switch.

The improved safety light and illuminating lamp forming the subject matter of the present invention is intended to be worn by persons during black-outs incident to air raids or when engaged in different kinds of pursuits requiring light for illuminating purposes.

The device comprises a harness consisting of spaced straps 5 and 6 having their upper portions joined by a loop 7 adapted to extend around the neck of the wearer, and their lower portions operatively connected with a belt indicated at 8. The strap 5 is provided with a fixed terminal loop 9 adapted to slidably receive the belt 8 while the strap 6 is formed with a series of openings 10 to receive the tongue of a buckle 11 carried by a detachable belt receiving loop 12, thereby to permit adjustment of the harness to fit persons of different sizes.

Associated with the harness is a lamp assembly box 13 preferably formed of metal and provided with a detachable top or cover 14 to permit the insertion or removal of one or more batteries 15. Disposed at the front of the box is a lens 16 including a reflector having an electric lamp 17 centered therein, the socket of which normally engages a contact plate 18, there being a conductor 19 secured to the contact plate 18 and another conductor 20 secured to a contact plate 21 operatively connected with the batteries.

Fitting in an opening 22 in the rear wall of the assembly box 13 is a sliding light control switch block 23. The light control switch comprises a housing 24 of insulating material having spaced posts or terminals 25 embedded therein, one of said terminals being secured to the conductor 19 and the other terminal to the conductor 20. The rear portion of the switch block 23 is provided with a recess in which is fitted a spring-pressed contact plate 26 having spaced projections 27 formed thereon and adapted to fit in sockets 28 formed in the terminals 25 for the purpose of holding the switch block in either on or off position. The switch block 23 normally projects through the opening 22 and is provided with an upwardly inclined serrated face 29, as best shown in Figure 4 of the drawings. Secured to the rear wall of the assembly box 13 are upper and lower metal strips 30 provided with guide loops 31 through which the suspension straps 5 and 6 extend, thereby to permit vertical sliding movement of the assembly box on the suspension straps and, at the same time, prevent tilting or canting movement of the box in its different positions of adjustment. It will here be noted that one of the straps, namely the strap 6, extends over and normally houses the serrated face of the switch block 23 and that the upper and lower guide loops at one side of the box serve to confine the adjacent portion of the strap 6 in a position to frictionally engage and operate the light control switch.

In operation, the harness is positioned on the wearer with the loop 7 thereof extending around the neck and with the loops 9 and 12 fitted over the belt 8, adjustment of the harness to fit the person being effected by manipulating the buckle 11, as will be readily understood. In order to adjust the assembly box vertically, it is merely necessary to exert an upward push thereon until the box is shifted to the desired position of adjustment and in which position, it will stay, due to the diverging arrangement of the straps 5 and 6. As the assembly box is moved upwardly, the serrated face of the switch block 23 will come in contact with the suspension strap 6 and open the switch, thereby interrupting the flow of current from the battery to the electric light and extinguishing the light. By exerting a downward push on the assembly box, the strap 6 will move the switch block 23 in the opposite direction to closed position so as to close the circuit through the battery and lamp and illuminate the latter. It will thus be seen that the assembly box, together with the lens and battery, are adjustable vertically of the harness as a unit, thus obviating the necessity of a separate container or holder for the battery and its associated parts, and consequently reducing the cost of manufacture. If desired, however, the light control switch, instead of being operable by engagement with one of the suspension straps, may be disposed at either side of the assembly box and actuated manually when it is desired to turn off or on the electric lamp.

It will thus be seen that there is provided a lighting assembly of simple and inexpensive construction, that can be conveniently worn by a person for illuminating purposes during blackouts incident to war conditions, and which can be used with equally good results by linemen, mechanics, and others working in dark or inaccessible places, for casting a beam of light in any desired direction.

It will, of course, be understood that the devices may be made in different sizes and shapes and constructed from any suitable material, without departing from the spirit of the invention.

Having thus described the invention, what is claimed is:

1. A device of the class described comprising a suspension device adapted to be disposed about a person's neck and having spaced straps provided with means for attachment to a support, a light assembly box including an electric lamp and battery slidably mounted for vertical movement as a unit on said straps, and a switch operatively connected with the battery and provided with a projecting portion over which one of said straps extends, said switch being actuated by sliding contact of the said projecting portion with the last mentioned strap for lighting the lamp when said box is moved in one direction and to extinguish the lamp when the box is moved in another direction.

2. A device of the class described comprising a belt, a suspension device adapted to be disposed about a person's neck and having spaced straps operatively connected with the belt, a light assembly box including an electric lamp and battery slidably mounted as a unit on said straps, spaced strips secured to the rear of the box and provided with guide loops through which said straps extend, and a switch operatively connected with the battery and having a portion thereof extending through the rear wall of the box for contact with the adjacent strap, said projecting portion of the switch being actuated by engagement with the adjacent strap for lighting the lamp when the box is moved in one direction and to extinguish the lamp when the box is moved in another direction.

3. A device of the class described comprising a belt, a suspension device adapted to be disposed about the neck of a person and having spaced straps operatively connected with the belt, a light assembly box including an electric lamp and battery slidably mounted as a unit on said straps, upper and lower transverse strips secured to the rear of the box and provided with loops through which the straps extend, a switch operatively connected with the battery and having a serrated portion normally projecting through the rear wall of the box in the path of one of said straps, certain of said loops serving to confine a portion of the adjacent strap in position to frictionally engage the serrated portion of the switch.

4. A device of the class described comprising a waist encircling belt, a suspension device adapted to be disposed about a person's neck and having spaced diverging straps with their lower ends operatively connected with the belt, a light assembly box including an electric lamp and battery slidably mounted as a unit on said straps, spaced upper and lower transverse strips secured to the rear of the box and provided with guide loops adapted to receive the straps, there being an opening formed in the box at the rear of one of the straps, a switch slidably mounted on the box and operatively connected with the battery, said switch being provided with a serrated portion normally projecting through the opening in the box for frictional contact with the adjacent suspension strap and in which position it is retained by the adjacent guide loops, said box, battery and electric lamp being adjustable as a unit vertically of the straps whereby to actuate the switch to extinguish the lamp when the box is moved in one direction and to illuminate the lamp when the box is moved in another direction.

5. A device of the class described comprising a harness adapted to be disposed about the neck of a person and having spaced downwardly extending diverging straps provided with means for attachment to a support, a light assembly box including an electric lamp, battery and battery circuit slidably mounted for vertical movement as a unit on said straps, and a switch operatively connected with the battery and provided with a projecting portion disposed at the rear of the light assembly box and actuated by frictional engagement with one of said straps for closing the circuit and lighting the lamp when the box is moved in one direction and to interrupt said circuit and extinguish the lamp when the box is moved in another direction.

6. A device of the class described comprising a harness adapted to be disposed about the neck of a person and having spaced diverging straps provided with means for attachment to a support, a light assembly comprising a box having a closed bottom and removable top and including an electric lamp and battery housed within the box, said lamp assembly being adjustable vertically of the straps, upper and lower rigid transverse strips secured directly to the rear wall of the box in spaced relation to the top and bottom thereof and provided with vertically alined guide loops through which said straps extend, and a switch in circuit with the battery and operable by engagement with one of said straps for controlling lighting of the lamp at any position of vertical adjustment thereof, said light assembly being movable as a unit on the straps to a selected position of vertical adjustment.

JOHN THOMAS POWELL.
EDWIN T. POWELL.